ized that tables can sometimes stretch unexpectedly.

United States Patent
Artieri et al.

(10) Patent No.: US 11,403,217 B2
(45) Date of Patent: Aug. 2, 2022

(54) MEMORY BANK GROUP INTERLEAVING

(71) Applicant: QUALCOMM INCORPORATED, San Diego, CA (US)

(72) Inventors: Alain Artieri, San Diego, CA (US); Jean-Jacques Lecler, Antibes (FR); Shyamkumar Thoziyoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 16/823,306

(22) Filed: Mar. 18, 2020

(65) Prior Publication Data
US 2021/0133100 A1     May 6, 2021

Related U.S. Application Data

(60) Provisional application No. 62/928,297, filed on Oct. 30, 2019.

(51) Int. Cl.
*G06F 12/06*     (2006.01)
*G06F 13/16*     (2006.01)
(Continued)

(52) U.S. Cl.
CPC ...... *G06F 12/0607* (2013.01); *G06F 12/0246* (2013.01); *G06F 12/0864* (2013.01);
(Continued)

(58) Field of Classification Search
None
See application file for complete search history.

(56) References Cited

U.S. PATENT DOCUMENTS 5,377,340 A * 12/1994 Seroussi ............. G06F 12/0607
                                                                 711/216
5,530,837 A * 6/1996 Williams ............ G06F 12/0607
                                                                  711/157
(Continued)

FOREIGN PATENT DOCUMENTS

JP         2013145545 A * 7/2013 ............. G11C 16/00

OTHER PUBLICATIONS

B. Ramakrishna Rau. "Pseudo-Randomly Interleaved Memory." Apr. 1991. ACM. ISCA'91. pp. 74-83. (Year: 1991).*
(Continued)

*Primary Examiner* — Nathan Sadler
(74) *Attorney, Agent, or Firm* — Smith Tempel Blaha LLC/Qualcomm

(57) ABSTRACT

Memory utilization in an SDRAM system may be improved by increasing memory bank group and memory bank interleaving. Memory bank group interleaving and memory bank interleaving may be increased by a memory controller generating a physical memory address in which the bank group address bits are positioned nearer the LSB of the physical memory address than the MSB. Alternatively, or in addition to positioning the bank group address bits in such a manner, memory bank group interleaving and memory bank interleaving may be increased by hashing the bank group address bits and bank address bits of the physical memory address with row address bits of the initial physical memory address, A rank address bit may also be involved in the hashing.

12 Claims, 12 Drawing Sheets

(51) Int. Cl.
*G06F 12/1018* (2016.01)
*G06F 12/02* (2006.01)
*G06F 12/0864* (2016.01)

(52) U.S. Cl.
CPC ...... *G06F 12/1018* (2013.01); *G06F 13/1647* (2013.01); *G06F 2212/7201* (2013.01)

(56) References Cited

U.S. PATENT DOCUMENTS

| | | | | |
|---|---|---|---|---|
| 10,860,473 B1* | 12/2020 | Gaddam | ............... | G11C 11/408 |
| 2006/0236072 A1* | 10/2006 | Lyon | ................... | G06F 12/0607 |
| | | | | 711/206 |
| 2013/0173991 A1* | 7/2013 | Ware | ....................... | G06F 11/10 |
| | | | | 714/763 |
| 2014/0293726 A1* | 10/2014 | Chen | ........................ | G11C 8/18 |
| | | | | 365/233.13 |
| 2015/0089183 A1 | 3/2015 | Bains et al. | | |
| 2016/0276002 A1* | 9/2016 | Lee | ......................... | G06F 12/06 |
| 2018/0019006 A1* | 1/2018 | Brandl | ................ | G06F 12/1018 |

OTHER PUBLICATIONS

Shao et al. "The Bit-reversal SDRAM Address Mapping." Oct. 2005. ACM. SCOPES '05. pp. 62-71. (Year: 2005).*
Abstractor JP 2013-145545. (Year: 2013).*
Richard Tervo. "ECE4253 Polynomials in GF(2)." Jan. 2012. https://www.ece.unb.ca/tervo/ece4253/poly.shtml.*
International Search Report and Written Opinion—PCT/US2020/053710—ISA/EPO—dated Feb. 2, 2021.
Lin B., et al., "Duplicon Cache: Mitigating Off-Chip Memory Bank and Bank Group Conflicts via Data Duplication", 2018 51st Annual IEEE/ACM International Symposium on MicroArchitecture (MICRO), IEEE, Oct. 20, 2018 (Oct. 20, 2018), pp. 285-297, XP033473304, DOI: 10.1109/MICRO.2018.00031 [retrieved on Dec. 12, 2018] p. 3-p. 5, p. 7-p. 8.
Shao J., et al., "Reducing Main Memory Access Latency through SDRAM Address Mapping Techniques and Access Reordering Mechanisms", Michigan Technological University, Dec. 12, 2006 (Dec. 12, 2006), 88 Pages, XP055768125, p. 39-p. 42.

* cited by examiner

| R   | = | a[33]^a[32]^a[28]^a[27]^a[26]^a[25]^a[24]^a[21]^a[20]^a[18]^a[15] |
| --- | --- | --- |
| BA1 | = | a[32]^a[31]^a[27]^a[26]^a[25]^a[24]^a[23]^a[20]^a[19]^a[17]^a[14] |
| BA0 | = | a[33]^a[31]^a[30]^a[26]^a[25]^a[24]^a[22]^a[19]^a[18]^a[16]^a[13] |
| BG0 | = | a[30]^a[29]^a[28]^a[27]^a[26]^a[23]^a[22]^a[20]^a[17]^a[11] |
| BG1 | = | a[33]^a[29]^a[28]^a[27]^a[26]^a[25]^a[22]^a[21]^a[19]^a[16]^a[7] |

| Phy Addr bit | 33 (MSB) | 32 | 31 | 30 | 29 | 28 | 27 | 26 | 25 | 24 | 23 | 22 | 21 | 20 | 19 | 18 | 17 |
|---|---|---|---|---|---|---|---|---|---|---|---|---|---|---|---|---|---|
| Default | R | R17 | R16 | R15 | R14 | R13 | R12 | R11 | R10 | R9 | R8 | R7 | R6 | R5 | R4 | R3 | R2 |
| Sync Mode | R | R17 | R16 | R15 | R14 | R13 | R12 | R11 | R10 | R9 | R8 | R7 | R6 | R5 | R4 | R3 | R2 |
| Refresh | R | R17 | R16 | R15 | R14 | R13 | R12 | R11 | R10 | R9 | R8 | R7 | R6 | R5 | R4 | R3 | R2 |
| Free-Running Mode | R0 | R17 | R16 | R15 | R14 | R13 | R12 | R11 | R10 | R9 | R8 | R7 | R6 | R5 | R4 | R3 | R2 |

| Phy Addr bit | 16 | 15 | 14 | 13 | 12 | 11 | 10 | 9 | 8 | 7 | 6 | 5 | 4 | 3 | 2 | 1 | 0 (LSB) |
|---|---|---|---|---|---|---|---|---|---|---|---|---|---|---|---|---|---|
| Default | R1 | R0 | BA1 | BA0 | BG1 | BG0 | C5 | C4 | C3 | C2 | C1 | C0 | 4 | 3 | 2 | 1 | 0 |
| Sync Mode | R1 | R0 | BA1 | BA0 | C2 | BG1 | C5 | C4 | C3 | BG0 | C1 | C0 | 0 | 0 | 0 | 0 | 0 |
| Refresh | R1 | R0 | BA1 | BA0 | C2 | BG0 | C5 | C4 | C3 | BG1 | C1 | C0 | 0 | 0 | 0 | 0 | 0 |
| Free-Running Mode | R1 | R | BA1 | BA0 | C2 | BG0 | C5 | C4 | C3 | BG1 | C1 | C0 | 0 | 0 | 0 | 0 | 0 |

FIG. 9

MEMORY BANK GROUP INTERLEAVING

RELATED APPLICATIONS STATEMENT

This Application claims priority under 35 U.S.C. § 119(e) to U.S. Provisional Patent Application Ser. No. 62/928,297, filed on Oct. 30, 2019, and entitled, "MEMORY BANK GROUP INTERLEAVING," the entire contents of which are hereby incorporated by reference.

DESCRIPTION OF THE RELATED ART

Portable computing devices ("PCDs") are becoming necessities for people on personal and professional levels. These devices may include cellular telephones (e.g., smartphones), portable digital assistants ("PDAs"), portable game consoles, palmtop computers, and other portable electronic devices. PCDs commonly contain integrated circuits or systems-on-a-chip ("SoCs") that include numerous components designed to work together to deliver functionality to a user. For example, an SoC may contain any number of processors, such as central processing units ("CPUs") with multiple cores, graphical processing units ("GPUs"), etc. Among other functions, such a processor may access memories.

A common type of memory that an SoC processor may access is known as double data-rate synchronous dynamic random access memory ("DDR-SDRAM," or for brevity, "DDR"). As a PCD is a battery-powered device in which saving power is an important goal, a common type of DDR in PCDs is low-power DRR ("LPDDR"). The DDR technology, which includes LPDDR technology, has evolved in iterations commonly referred to as DDR, DDR2, DDR3, DDR4, DDR5, etc. A feature of some of the later DDR iterations, known as bank groups, organizes the memory into two or more bank groups, each having two or more banks. Two or more bank groups may be accessed in parallel. For example, in a DDR scheme having two bank groups, after issuing a command to access a first bank group, the memory controller may issue a command to access a second bank group before the first bank group access has completed. Issuing consecutive access commands directed in an alternating or ping-ponging manner between two bank groups results in lower latency than if two or more consecutive access commands were directed to the same bank group.

Extending the foregoing example to a DDR scheme having four bank groups, the memory controller may interleave access commands among the four bank groups in a manner that attempts to minimize instances in which two consecutive accesses are directed to the same bank group. More generally, to increase memory utilization the memory controller may interleave access commands among the four bank groups in a manner that attempts to spread accesses evenly across all bank groups and banks. It would be desirable to further improve spread among bank groups and banks and thus improve memory utilization and provide related benefits in DDR systems.

SUMMARY OF THE DISCLOSURE

Systems, methods and computer program products are disclosed for memory bank interleaving in a synchronous dynamic random access memory (SDRAM) system.

An exemplary method for memory bank interleaving may include a memory controller generating new bank group address bits and new bank address bits by hashing a plurality of bank group address bits of an initial physical memory address, a plurality of bank address bits of the initial physical memory address, and a plurality of row address bits of the initial physical memory address. The method may further include the memory controller generating a modified physical memory address by replacing the bank group address bits and bank address bits of the initial physical memory address with the respective new bank group address bits and bank address bits. The method may include the memory controller providing the modified physical memory address to an SDRAM chip.

Another exemplary method for memory bank interleaving may include a memory controller generating a physical memory address having a plurality of bank group address bits positioned nearer a least-significant bit (LSB) of the physical memory address than a most-significant bit (MSB) of the physical memory address. The method may include the memory controller providing the physical memory address to an SDRAM chip.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 3 further illustrates the hashing method of FIG. 2, in accordance with exemplary embodiments.

FIG. 5 further illustrates the hashing method of FIG. 4, in accordance with exemplary embodiments.

FIG. 7 further illustrates the hashing method of FIG. 6, in accordance with exemplary embodiments.

FIG. 9 illustrates examples of physical memory address schemes or mappings, in accordance with exemplary embodiments.

DETAILED DESCRIPTION

The word "exemplary" is used herein to mean "serving as an example, instance, or illustration." The word "illustrative" may be used herein synonymously with "exemplary." Any aspect described herein as "illustrative" or "exemplary" is not necessarily to be construed as preferred or advantageous over other aspects.

As DDR-SDRAM technology continues to evolve, improving spread among banks and bank groups in DDR-SDRAM has become even more important. For example, the LPDDR5 specification requires that two consecutive burst accesses of the type referred to as BL16, which is a 32 byte access on 128-bit boundaries, must be in different bank groups when the frequency of operation exceeds 1600 MHz. (Another type of burst access is referred to as BL32, which is a 64 byte access on 256-bit boundaries.)

Figure 1:
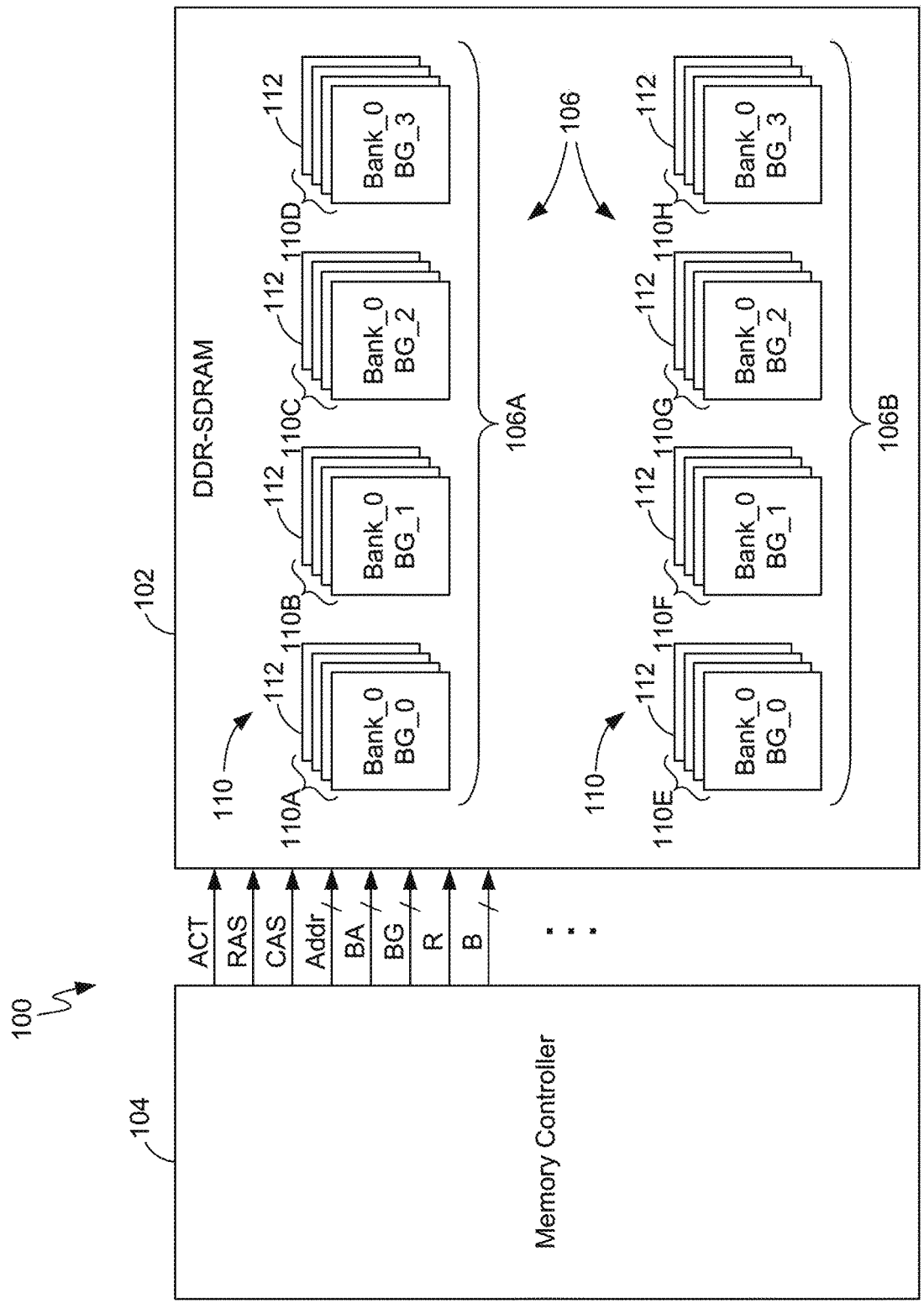
FIG. 1 is a block diagram of a DDR-SDRAM system embodying systems and methods for interleaving memory bank groups, in accordance with exemplary embodiments.

As illustrated in FIG. 1, a memory system 100 may include a DDR-SDRAM or DDR 102 coupled to a memory controller 104. The DDR 102 is organized as two ranks 106: a first rank 106A, and a second rank 106B. The first rank 106A is organized as four bank groups 110: a first hank group 110A, a second bank group 110B, a third bank group 110C, and a fourth bank group nap. The second rank 106B is similarly organized as another four bank groups 110: a fifth hank group 110E, a sixth bank group 110F, a seventh bank group 110G, and an eighth bank group 110H. The bank groups 110 may alternatively be identified by the indices 0-3: bank groups 110A and 110E each may be identified as "BG_0"; bank groups 110B and 110F each may be identified as "BG_1": bank groups 110C and 110G each may be identified as "BG_2"; and bank groups 110D and 110H each may be identified as "BG_3". Each of the bank groups 110 may be organized as four banks 112, which may also be identified as Bank_0, Bank_1, Bank_2, and Bank_3. The DDR 102 is depicted in a conceptual manner in FIG. 1 for purposes of clarity, and individual physical memory chips are not indicated. Rather, the ranks 106, bank groups 110, and banks 112 may be mapped to the physical memory chips in any manner. Although in the embodiment illustrated in FIG. 1 there are four bank groups 110, each having four banks 112, in other embodiments there may be other numbers of bank groups and banks.

Although not all signals communicated between the DDR 102 and memory controller 104 are shown in FIG. 1 for purposes of clarity, some of the signals relevant to the present disclosure may include: an activation ("ACT") signal, a row address select ("RAS") signal, a column address select ("CAS") signal, a (row and column) address ("Addr"), a bank address ("BA"), a bank group ("BG") address, a rank address ("R"), and a burst address ("B"). It should be understood that these signals are shown conceptually and do not necessarily represent physical buses or signal lines. In accordance with the example described above with regard to FIG. 1, the rank address R may consist of one bit, the bank group address may consist of two bits BG[1:0], and the bank address may consist of two bits BA[1:0]. Further, for example, the row address may be 18 bits R[17:0], the column address may be six bits C[5:0] (e.g., to represent a BL16 address in a 2 KB page), and the burst address may be four bits B[3:0]. Nevertheless, as described below the burst address may be set to zero in many examples. Therefore, a complete physical address (not including a burst address) may consist of a total of, for example, 34 bits.

In accordance with one aspect of the present disclosure, randomizing the accesses among banks and bank groups may improve memory utilization by improving the spread over the banks and bank groups. Randomizing the accesses may comprise applying a hash algorithm to the bank address, bank group address, or both the bank address and bank group address. The algorithm may hash the bank address and bank group address with, for example, the row address. In some examples, the algorithm may hash the bank address and bank group address with the row address only; the bank address and bank group address are not hashed with any other bits, such as bits of the column address. The memory controller 104 (FIG. 1) may perform the hash algorithm upon the physical address prior to providing the physical address to the DDR 102 during an access request.

Figure 2:
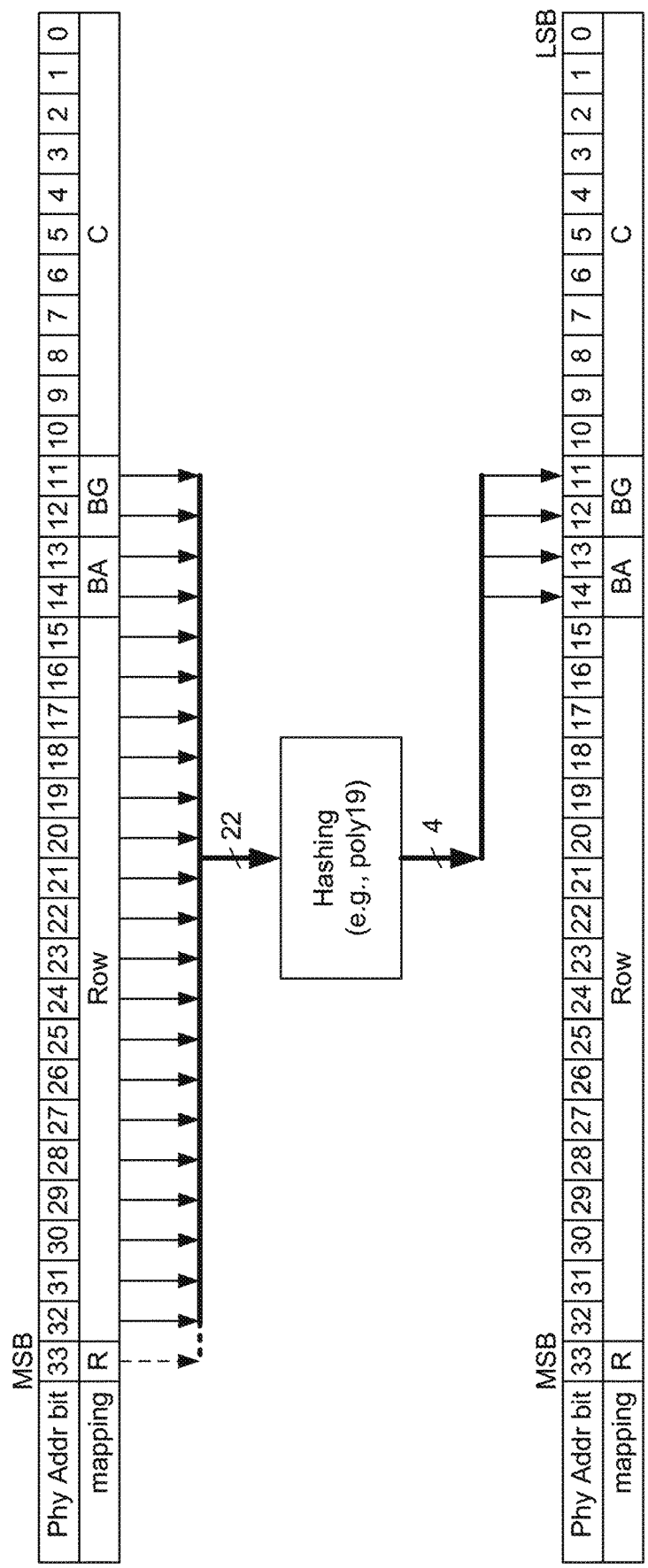
FIG. 2 illustrates application of a hashing method to a physical memory address scheme or mapping, in accordance with exemplary embodiments.
Figure 3:
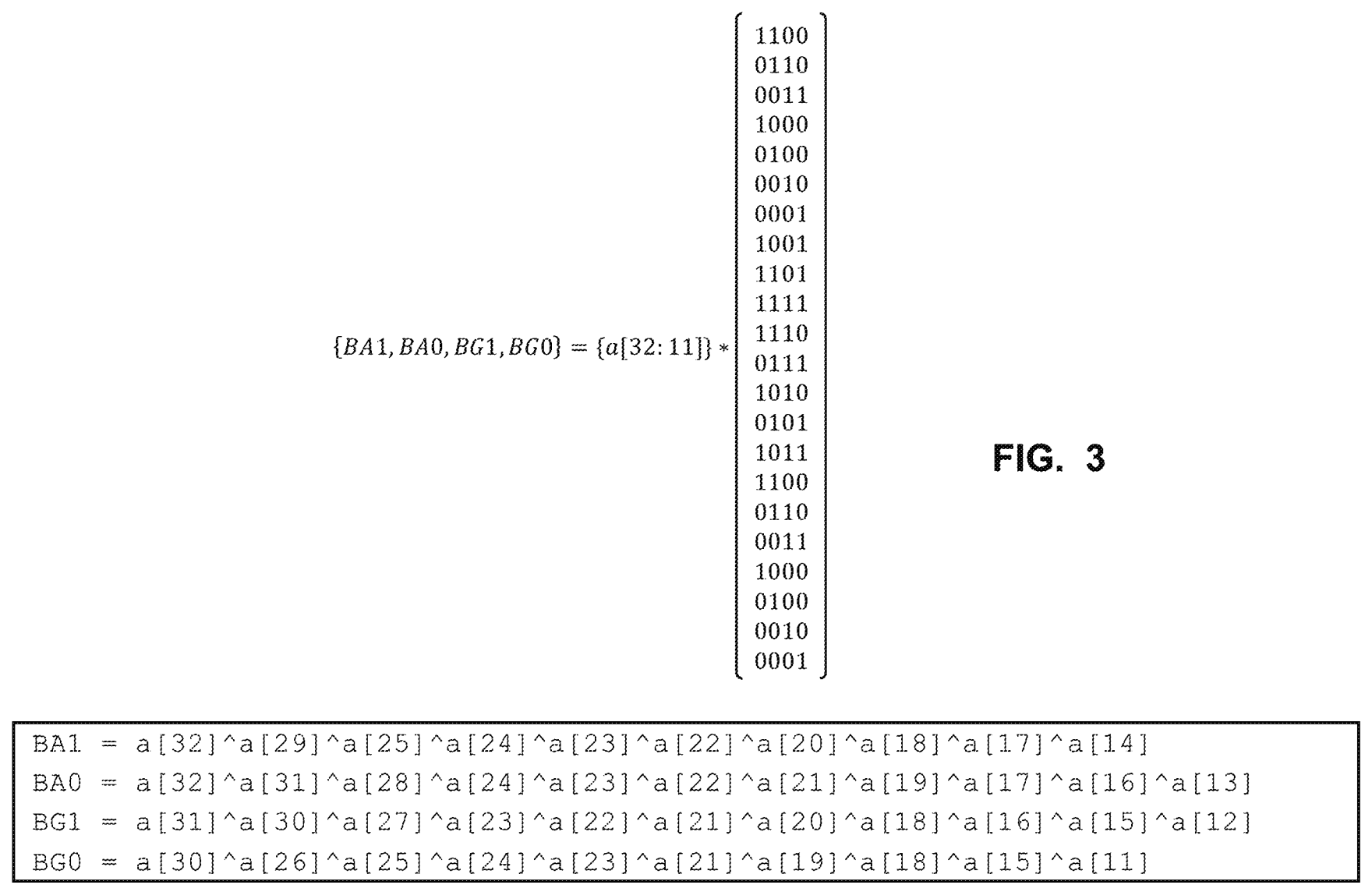

As illustrated in FIG. 2, in one example the bank group address bits BG[1:0] and bank address bits BA[1:0] are hashed together with the row address bits R[17:0] using a poly19 hash algorithm. An application of the poly19 hash algorithm to the physical address is shown in FIG. 3, In some embodiments, the rank address bit R may also be hashed together with the foregoing bits, as indicated by the arrow in broken line from the rank address bit R. In the example illustrated in FIGS. 2-3, the physical address is defined as having the rank address (bit) R mapped to the 33rd bit position, the row address R[17:0] mapped to the 32nd-15th bit positions, BA[1] mapped to the 14th bit position, BA[0] mapped to the 13th bit position, BG[1] mapped to the 12th bit position, BG[0] mapped to the 11th bit position, and the column address C[5:0] mapped to the 10th-5th bit positions. However, for purposes of clarity the 10th-1st bit positions are all denoted as Column or "C" bits in FIG. 2, because the burst address B[3:0] that may in some examples (not shown) be mapped to the 4th-1st bit positions is fixed at a value of 0 in this example. The 0th bit is unused in this example and therefore also fixed at a value of 0.

The hash algorithm may perform a matrix multiplication operation between a set of bits of the physical address and a hash matrix. In the example of a poly19 hash shown in FIG. 3, the set of bits of the physical address comprises the 11th through 32nd bits, which may be represented in the notation "a[32:11]," where "a" is the physical address bit array. The hash matrix in FIG. 3 is derived from primitive polynomials over Galois Field (2) or "GF(2)": $x^4+x+1$. The result of the matrix multiplication and thus the output of the hash algorithm is another set of physical address bits, i.e., new bank address and bank group bits: {BA[1],BA[0],BG[0],BG[0]}. The matrix multiplication is also shown in expanded form in FIG. 3 as a string of bitwise exclusive-OR operations (represented by the symbol: "∧") for each of RAW, BA[0], BG[1] and BG[0] (for brevity shown using the notation "BA1," "BA0," "BG1" and "BG0"). Note that only the four bits consisting of the bank group address BG[1:0] and bank address BA[1:0] are changed (by the hashing). That is, the memory controller 104 leaves the rank address, row address, column address, and burst address unchanged.

Figure 4:
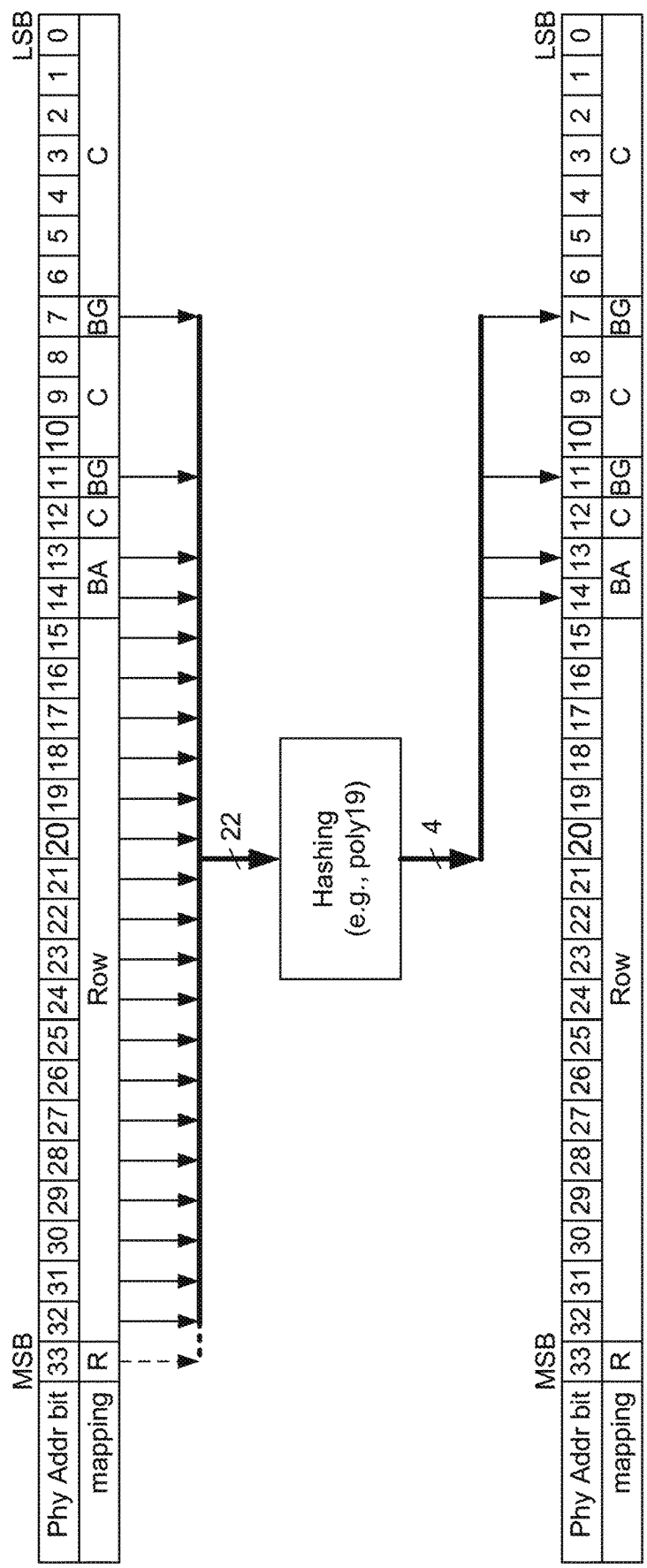
FIG. 4 illustrates application of a hashing method to another physical memory address scheme or mapping, in accordance with exemplary embodiments.
Figure 5:
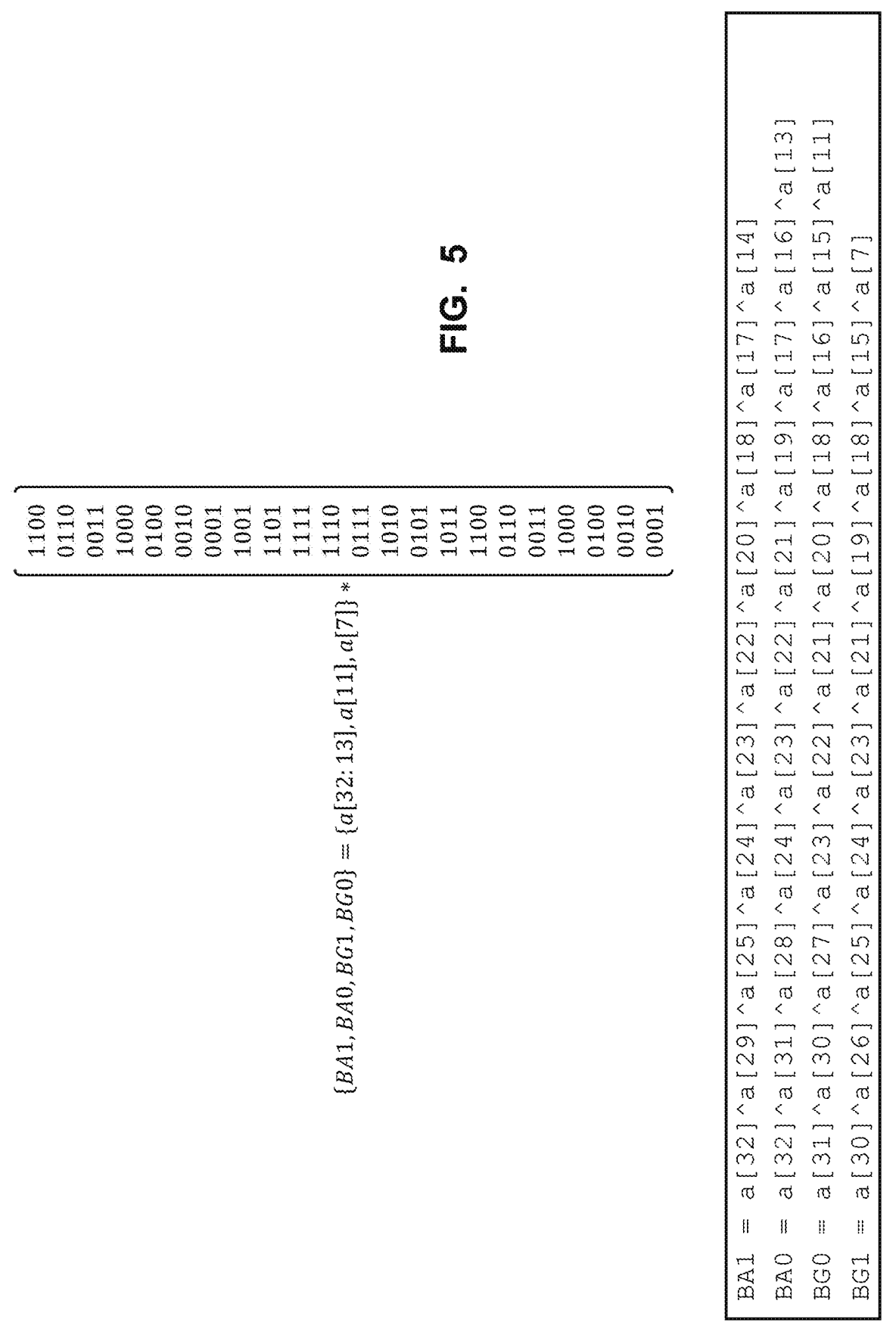

As illustrated in FIG. 4, in another example the bank group address bits BG[1:0] and bank address bits BA[1:0] are similarly hashed together with the row address bits R[17:0] using a poly19 hash algorithm. In some embodiments, the rank address bit R may also be hashed together with the foregoing bits, as indicated by the arrow in broken line from the rank address bit R. An application of the poly19 hash algorithm to the physical address is shown in FIG. 5. In the example illustrated in FIGS. 4-5, the physical address is defined as having the rank address (bit) R mapped to the 33rd bit position, R[17:0] mapped to the 32nd-15th bit positions, BA[1] mapped to the 14th bit position, BA[0] mapped to the 13th bit position, C[5] mapped to the 12th bit position, BG[1] mapped to the 11th bit position, C[4:2] mapped to the 10th-8th bit positions, BG[0] mapped to the 7th bit position, and C[1:0] mapped to the 6th-5th bit positions. However, for purposes of clarity the 6th-1st bit positions are all denoted as Column or "C" bits in FIG. 4, because the burst address B[3:0] that may in some examples (not shown) be mapped to the 4th-1st bit positions is fixed at a value of 0 in this example. The 0th bit is unused in this example and therefore also fixed at a value of 0.

In the example of a poly19 hash shown in FIG. 5, the set of bits of the physical address comprises {a[32:13],a[11],a[7]}. As the underlying hash algorithm in FIG. 5 is the same poly19 hash as described above with regard to FIG. 3, the hash matrix in FIG. 5 is the same as in FIG. 3. The result of the matrix multiplication and thus the output of the hash algorithm is the set of physical address bits: {BA[1],BA[0], BG[1],BG[0]}. The matrix multiplication is also shown in expanded form in FIG. 5 in the same manner as described above with regard to FIG. 3. Note that only the four bits consisting of the bank group address GG[1:0] and bank address BA[1:0] are changed (by the hashing). That is, the memory controller 104 leaves the rank address, row address, column address, and burst address unchanged.

Figure 6:
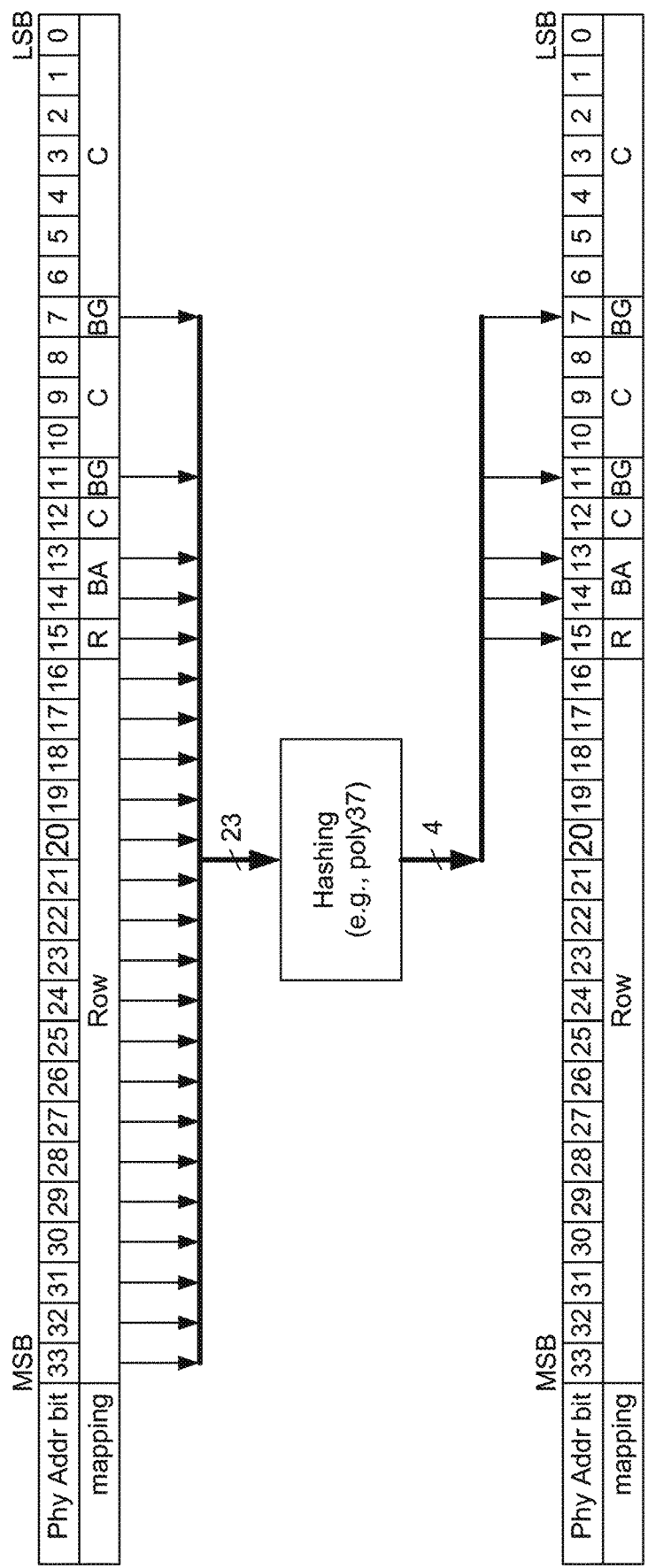
FIG. 6 illustrates application of a hashing method to still another physical memory address scheme or mapping, in accordance with exemplary embodiments.

As illustrated in FIG. 6, in another example the bank group address bits BG[1:0] and bank address bits BA[1:0] are similarly hashed together with the row address bits R[17:0] using a poly37 hash algorithm. However, note that in this embodiment the rank address bit R is also hashed together with the foregoing bits. An application of the poly37 hash algorithm to the physical address is shown in FIG. 7. In the example illustrated in FIGS. 6-7, the physical address is defined as having the rank address (bit) R mapped to the 15th bit position, R[16:0] mapped to the 33rd-16th bit positions, BA[1] mapped to the 14th bit position, BA[0] mapped to the 13th bit position, C[5] mapped to the 12th bit position, BG[1] mapped to the 11th bit position, C[4:2] mapped to the 10th-8th bit positions, BG[0] mapped to the 7th bit position, and C[1:0] mapped to the 6th-5th bit positions. However, for purposes of clarity the 6th-1st bit positions are all denoted as Column or "C" bits in FIG. 6, because the burst address B[3:0] that may in some examples (not shown) be mapped to the 4th-1st bit positions is fixed at a value of 0 in this example. The 0th bit is unused in this example and therefore also fixed at a value of 0.

In the example of a poly37 hash shown in FIG. 7, the set of bits of the physical address comprises {a[33:13],a[11],a[7]}. The hash matrix in FIG. 7 is derived from primitive polynomials over GF(2): $x^5+x^2+1$. The result of the matrix multiplication and thus the output of the hash algorithm is the set of physical address bits: {R,BA[1],BA[0],BG[1],BG[0]}. The matrix multiplication is also shown in expanded form in FIG. 7 for each of K, BA[1], BA[0], BG[1] and BG[0]. Note that only the four bits consisting of the bank group address BG[1:0] and bank address BA[1:0] are changed (by the hashing). That is, the memory controller 104 leaves the rank address, row address, column address, and burst address unchanged. Although in the foregoing examples poly19 and poly37 hash algorithms are used, one of ordinary skill in the art will appreciate that other hash algorithms may be used.

Figure 8:
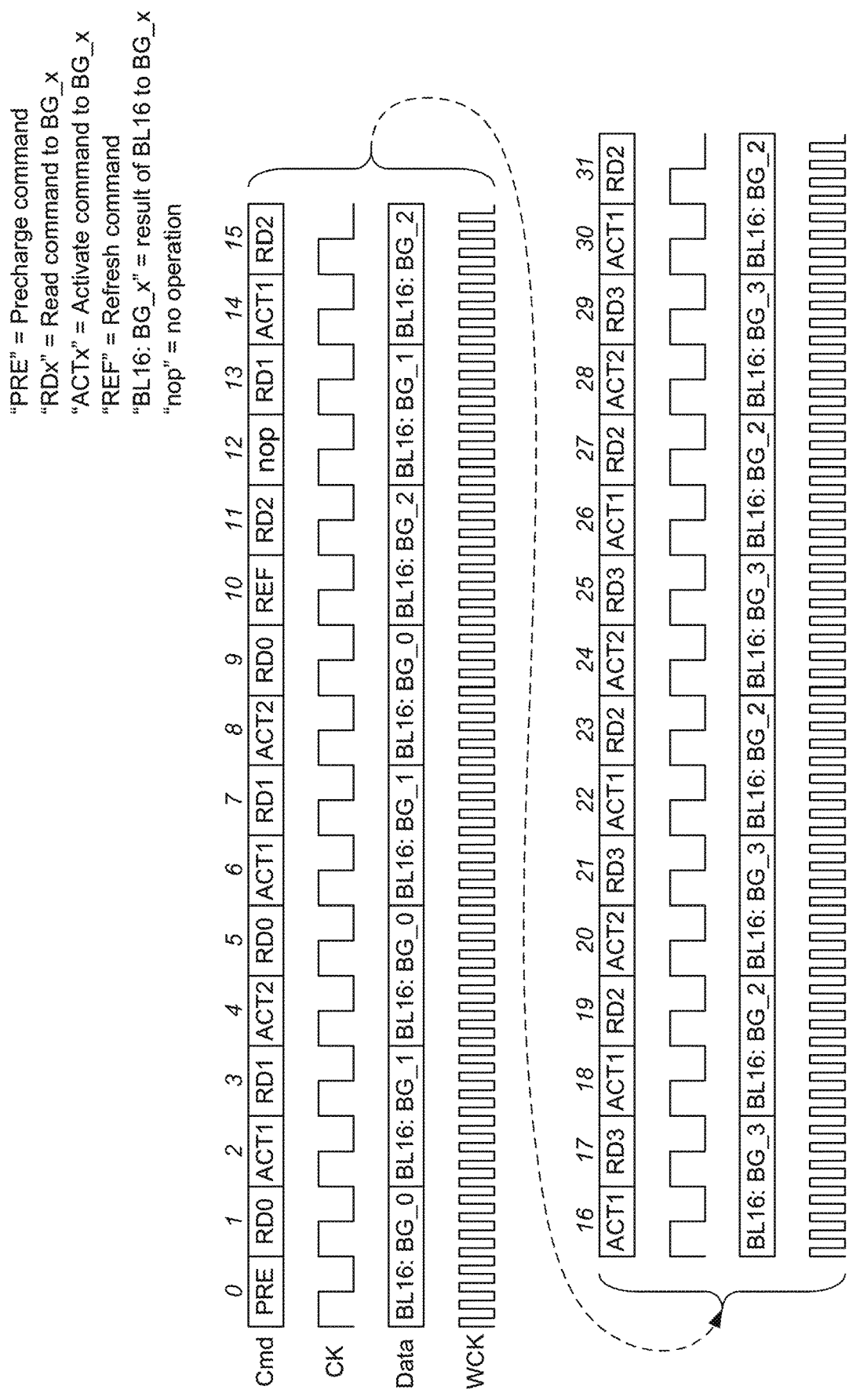
FIG. 8 is a timing diagram illustrating a sequence of read commands and related signals, in accordance with exemplary embodiments.

As illustrated in FIG. 8, in an example of a sequence of memory read operations, as a result of the above-described hashing method or other method for improving memory bank interleaving, no two consecutive BL16 read commands ("RDx") are directed to the same bank group, thereby complying with that requirement of the LPDDR5 specification. The write clock ("WCK") frequency in the example illustrated in FIG. 8 may be 3200 MHz. It should be noted in FIG. 8 that the Data appears on the data bus after a delay, which is the Read Latency. It should also be noted that although the commands ("Cmd") and Data appear vertically aligned in FIG. 8, there is a delay in time between the RD command stream and the Data response stream.

The example illustrated in FIG. 8 also illustrates that high DDR utilization can be achieved despite a relatively small spread among banks. If instead of the example illustrated in FIG. 8, there were an example (not shown) in which all read transactions were directed to the same bank group, only a 50% DDR utilization could be achieved. Suppose in FIG. 8 all RDx are RD0 to the same BG. There would be at most one RD0 every other odd cycle (1, 5, 9, . . . ). Hence, only 50% of the data bus could be utilized.

If instead of the example illustrated in FIG. 8, there were an example (not shown) in which 2 BL16 read transactions 64 byte random transactions) were directed to the same bank (in the same bank group), only an 8% DDR utilization could be achieved. More specifically, in such a case the two BL16 transactions would be directed to different rows in the same bank, a bank conflict. Each such access requires an activation of a different row in the same bank. The minimum time between two activations of the same bank is the DDR tRC timing, which is 60 ns. At 3200 MHz, the duration of two BL16 data transfer on the data bus is 5 ns. Hence, the data bus utilization would be 5/60 which is about 8%.

If instead of the example illustrated in FIG. 8, there were an example (not shown) in which 2 BL16 read transactions 64 byte random transactions) were spread over 12 banks, 100% DDR utilization could be achieved. As a bank can be activated at most every 60 ns for 2 BL16 transactions each taking 5 ns on the data bus, it would require 60/5 banks (i.e., 12 banks in parallel) to achieve 100% utilization. However, it may be noted from the example illustrated in FIG. 8 that 8 BL16 read transactions (i.e., 256 byte random transactions), may be spread over only 4 banks and still achieve 100% DDR utilization. The example thus illustrates that even with a relatively small spread of 4 banks, 100% DDR utilization can be achieved.

In accordance with another aspect of the present disclosure, spread among banks and bank groups can be increased by mapping one or more bank address bits and bank group address bits, respectively, to physical address bit positions nearer to the least-significant bit ("LSB") than the most-significant bit. ("MSB"). The memory controller 104 (FIG. 1) may perform such mapping prior to providing the physical address to the DDR 102 during an access request.

Conventionally, the column address may be mapped to lower-order bits of a DDR physical address than the row address. That is, in accordance with a conventional DDR address mapping scheme (not shown), a group of sequential positions nearer the LSB end of the physical address than the MSB end may define the column address, and another group of sequential positions in the physical address nearer the MSB end of the physical address may define the row address. Also conventionally, the bank group address may be mapped to higher-order bits of the physical address than the bank address, and the bank address may be mapped to higher-order bits of the physical address than the row and column addresses.

As illustrated in FIG. 9, in various examples one or more bank group address bits or bank address bits may be mapped to positions in the physical address nearer to the LSB than to the MSB. The examples recognize that there is a tradeoff between bank group spread and page hit rate. As long as the bank group spread is sufficient to meet the desired constraints, such as the above-referenced LPDDR5 requirement that no two consecutive BL16 read commands be directed to the same bank group, maximizing page hit rate is best for performance and power efficiency. However, the nearer that bank group address bits or bank address bits are mapped to the LSB (and the farther from the MSB), the greater the negative impact on page hit rate (i.e., the greater the likelihood of page misses). Although in the illustrated examples the physical address size is 34 bits (i.e., the 33rd bit position defines the MSB), the principles described herein may be applied to physical addresses of other sizes. The number of address bits depends on the DRAM density.

In one mapping example, which may be referred to as a "default" mapping, bank address and bank group address bits are mapped to positions approximately in the middle of the physical address but somewhat nearer to the LSB, such as, for example, Tanning the 11th through 14th bit positions. As the 33rd bit position defines the MSB, the distance between the 14th bit position and the MSB is 19 bit positions, while the distance between the 11th bit position and the LSB is 11 bit positions. Note that each of the 11th through 14th bit positions is nearer to the LSB than the MSB. More specifically, in the "default" mapping example illustrated in FIG. 9 BA[1] is mapped to the 14th bit position, BA[0] is mapped to the 13th bit position, BG[1] is mapped to the 12th bit position, and BG[0] is mapped to the 11th bit position. Further, in this default mapping example the rank address bit R is mapped to the 33rd bit position, the row address R[17:0] is mapped to the 32nd through 15th bit positions, the column address C[5:0] is mapped to the 10th through 5th bit positions. Although the burst address B[3:0] may be mapped to the 4th through 1st bit positions, these bits are generally fixed at a value of 0. The 0th bit of the physical addressed is unused (i.e., also set to a fixed value of 0) in the illustrated examples because, as the burst unit is 16-bit, the burst unit is a pair of bytes. It may be noted that in the default mapping example the bank address bits and bank group address bits are mapped to lower-order bit positions than the row address and higher-order bit positions than the column address.

In another mapping example illustrated in FIG. 9, which may be referred to as a "sync mode" mapping, bank address and bank group address bits are similarly mapped to positions in the physical address between the row address and the column address. More specifically, in the "sync mode" mapping example illustrated in FIG. 9 RAW is mapped to the 14th bit position, BA[0] is mapped to the 13th bit position, BG[1] is mapped to the 11th bit position, and BG[0] is mapped to the 7th bit position. In this example, both bank address bits BA[1:0] and one of the bank address bits, BG[1], are mapped to positions approximately in the middle of the physical address, while the other bank address bit, BG[0], is mapped to a position even closer to the LSB. Further, in this sync mode mapping example the rank address bit R is mapped to the 33rd bit position, the row address R[17:0] is mapped to the 32nd through 15th bit positions, the column address bit C[2] is mapped to the 12th bit position, the column address bits C[5:3] are mapped to the 10th through 8th bit positions, the column address bits C[1:0] are mapped to the 6th through 5th bit positions, and the remaining bits (in the 4th-0th positions) are fixed at a value of 0. The term "sync mode" refers to WCK CAS sync mode. A rank to rank switch induces a penalty that is relatively high compared with modes of operation other than WCK CAS sync mode. The rank bit R is mapped to the physical address MSB (i.e., the 33rd bit position in the illustrated example) because maximizing batches (i.e., consecutive accesses) in the same rank may help avoid the relatively high penalty of a rank to rank switch.

In still another mapping example illustrated in FIG. 9, which may be referred to as a "optimized refresh mode" mapping, BA[1] is mapped to the 14th bit position, BA[0] is mapped to the 13th bit position, BG[1] is mapped to the 7th bit position, and BG[0] is mapped to the 11th bit position. In other words, in the optimized refresh mode mapping example, BG[0] and BG[1.] are mapped to positions that are swapped with (i.e., the reverse of) the positions to which they are mapped in the sync mode example. Note that in the optimized refresh mode example, the lower-order bit of the bank group address, BG[0], is mapped to a higher-order position (11th) in the physical address than the position (7th) to which the higher-order bit of the bank group address, BG[1], is mapped. The term "optimized refresh mode" refers to a per-bank refresh command that is used to refresh a pair of banks with the same BA[1:0] and BG[0] bits. Consequently, mapping BG[1] to a lower-order position than BG[0] may improve performance, as the banks simultaneously refreshed will block a narrower address space. In this example, both bank address bits BA[1:0] and one of the bank address bits, BG[0], are mapped to positions approximately in the middle of the physical address, while the other bank address bit, BG[1], is mapped to a position even closer to the LSB. The remaining bits (i.e., rank address, row address and column address) are mapped to the same positions as in the sync mode mapping example described above.

In yet another mapping example illustrated in FIG. 9, which may be referred to as a "free-running mode" mapping, with one exception the bank address, bank group, row address and column address are mapped to the same positions as in the optimized refresh mode described above. The term "free-running mode" refers to the WCK free-running mode. In the free-running mode the above-referenced penalty induced by a rank to rank switch is lower than in the sync mode. As a dual-rank DDR system can be seen as a single system of the banks of both ranks a collective 32 banks), the collective banks can be leveraged to increase the bank spread by mapping the rank address bit R nearer to the physical address LSB than the MSB. The difference between the free-running mode mapping example illustrated in FIG. 9 and the optimized refresh mode mapping example is that in the free-running mode example the rank address bit R may be mapped to the 15th bit position, and the R[0] bit that was mapped to that bit position in the refresh mode (and other modes described above) may be mapped to the 33rd bit position. In the illustrated example, in which the 33rd bit position defines the MSB, the distance between the 15th bit position and the MSB is 18 bit positions, while the distance between the 15th bit position and the LSB is 15 bit positions.

Figure 10:
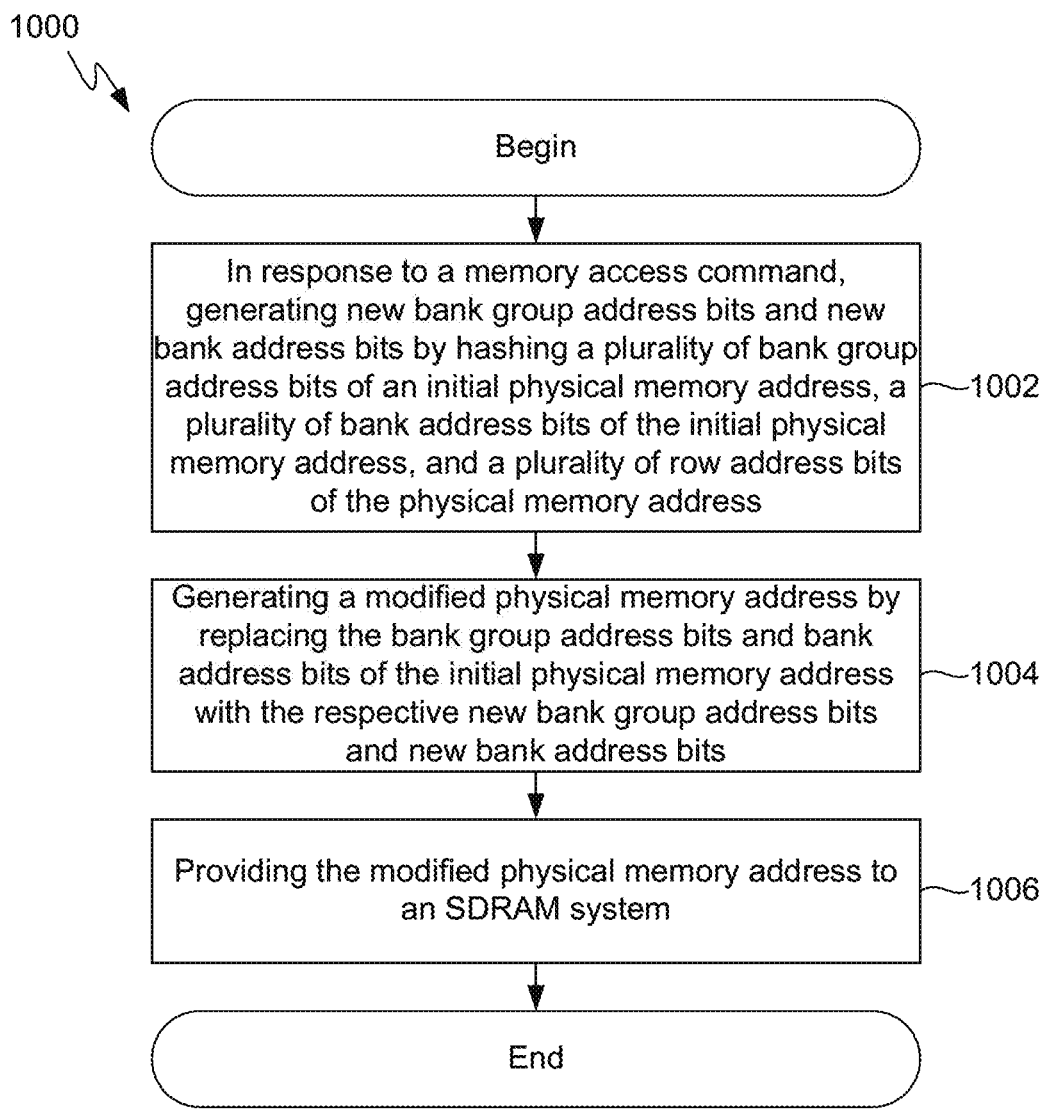
FIG. 10 is a flow diagram illustrating a method for interleaving memory bank groups that relates to hashing a bank group address, in accordance with exemplary embodiments.

As illustrated in FIG. 10, an exemplary method for memory bank group interleaving in an SDRAM system may be performed in response to a memory access command. As indicated by block 1002, a memory controller (not shown in FIG. 10) may generate new bank group address bits and new bank address bits by hashing a plurality of bank group address bits of an initial physical memory address, a plurality of bank address bits of the initial physical memory address, and a plurality of row address bits of the initial physical memory address. As described above with regard to 2-7, the bank address (e.g., two bits) in combination with the bank group address (e.g., also two bits, for a total of four bits) may be hashed with the row address to obtain a more randomized bank address and bank group address. Bits other than the row address, such as column address bits, may be excluded from the bits that are hashed with the bank group address.

As indicated by block 1004, the memory controller may generate a modified physical memory address by replacing the bank group address bits and bank address bits of the initial physical memory address with the respective new bank group address bits and bank address bits. The memory controller may then provide the modified physical memory address to the physical SDRAM memory chips instead of the initial or original physical memory address, as indicated by block 1006.

Figure 11:
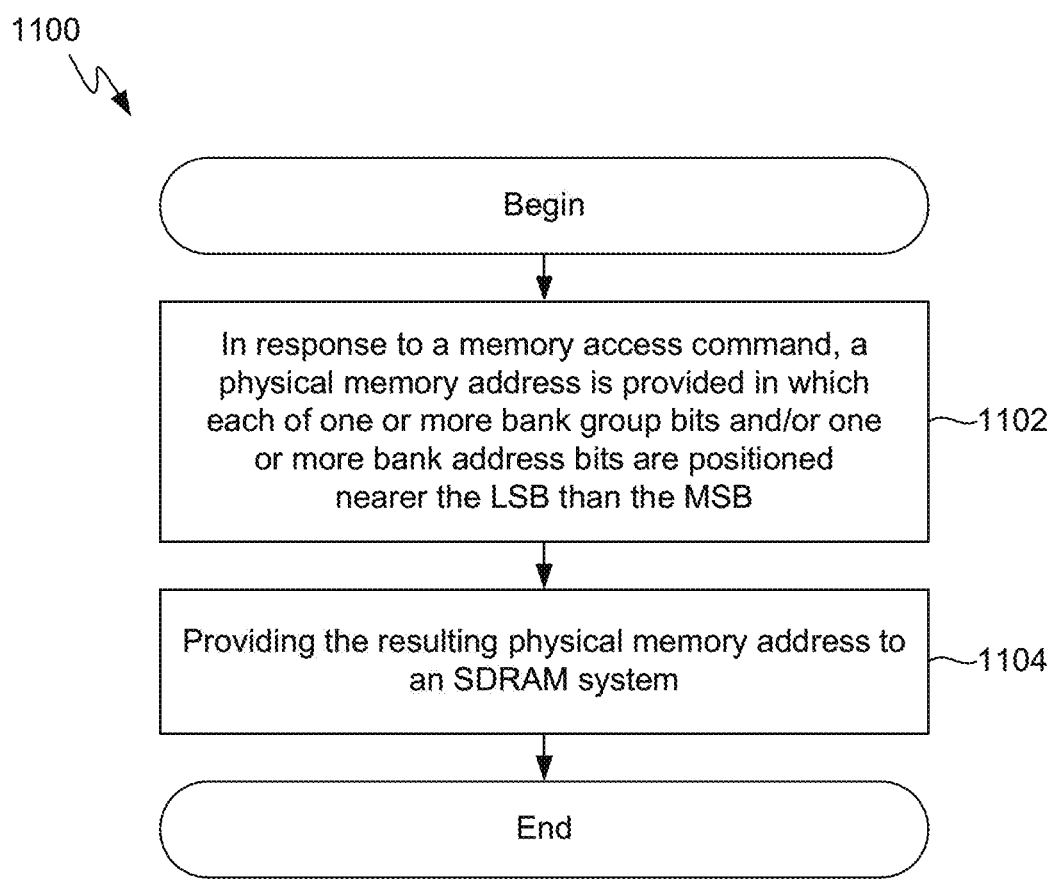
FIG. 11 is a flow diagram illustrating a method for interleaving memory bank groups that relates to selecting a physical address scheme or mapping based on an operational mode, in accordance with exemplary embodiments.

As illustrated in FIG. 11, an exemplary method for memory bank group interleaving in an SDRAM system may begin in response to a memory access command, as indicated by block 1102. A memory controller (not shown in FIG. 11) may generate a physical memory address in which each of one or more bank group bits or one or more bank address bits or the rank bit are positioned nearer the LSB than the MSB, such as in the manner described above with regard to FIG. 9.

Although not shown in FIG. 11, the memory controller may select a mapping from among two or more alternatives, depending upon the mode in which the SDRAM is operating. For example, when the SDRAM system is operating in the WCK CAS sync mode, the memory controller may generate a physical memory address in which one of the bank group bits is positioned even nearer the LSB than when the SDRAM system is operating in a default mode (i.e., any mode other than WCK CAS, refresh mode, or WCK free-running mode). When the SDRAM system is operating in the optimized refresh mode, a lower-order bit of the bank group address may be mapped to a higher-order position in the physical address than a higher-order bit of the bank group address. The memory controller may then provide the physical address to the physical SDRAM memory chips, as indicated by block 1104. When the SDRAM system is operating in the WCK free-running mode, a rank address may be mapped to a position nearer the LSB than the MSB.

It should be understood that the above-described methods 1100 (FIG. 11) and 1000 (FIG. 10) may be embodied in combination. That is, hashing of bank address and bank group address bits in accordance with the method 1000 may be applied to the bits as mapped to a physical memory address in accordance with the method 1100.

Figure 12:
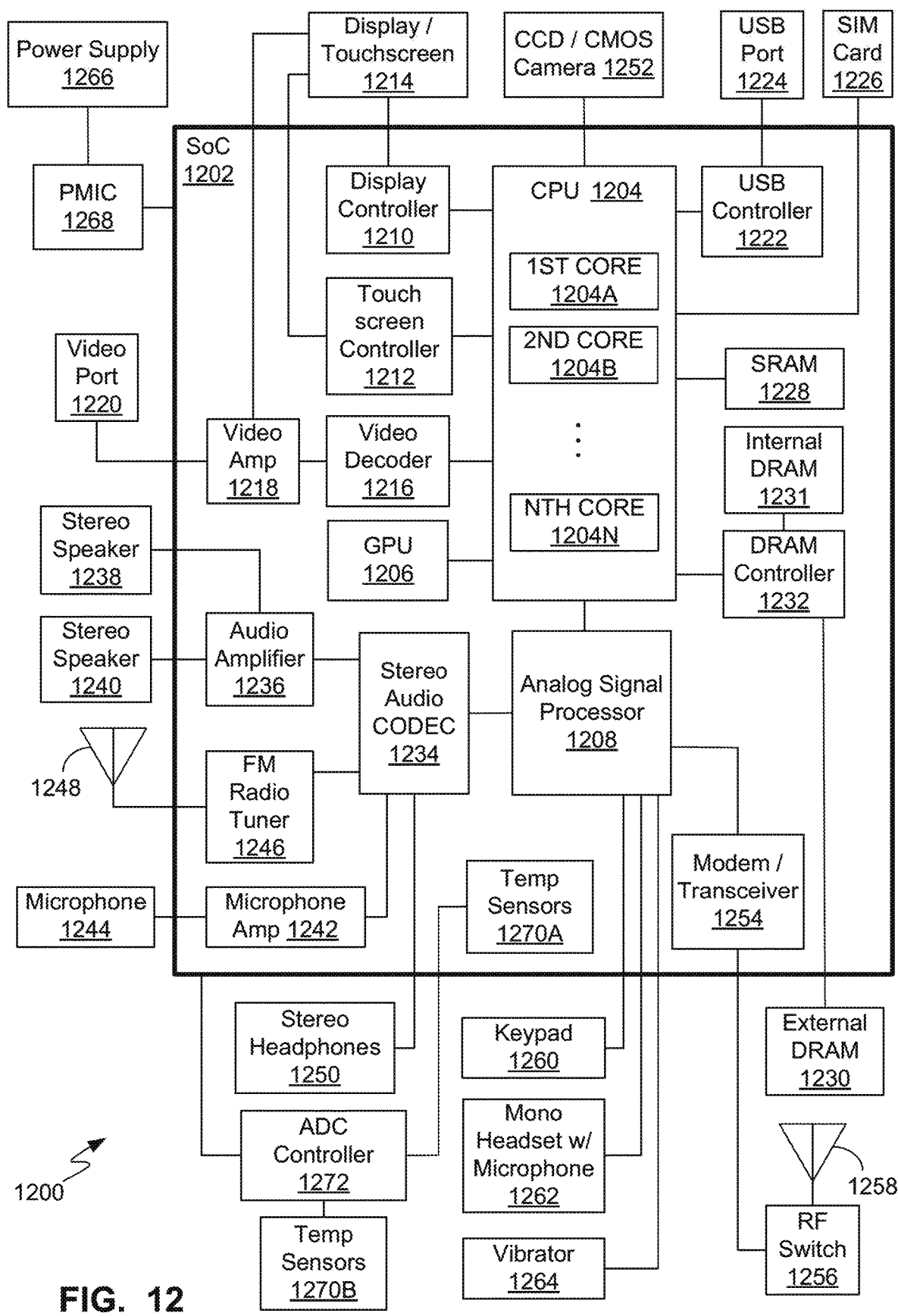
FIG. 12 is a block diagram of a PCD, in accordance with exemplary embodiments.

As illustrated in FIG. 12, illustrative or exemplary embodiments of systems and methods for memory bank group interleaving may be embodied in a PCI 1200. The PCD 1200 includes a system-on-a-chip ("SoC") 1202, i.e., a system embodied in an integrated circuit chip. The SoC 1202 may include a CPU 1204, a GPU 1206, or other processors. The CPU 1204 may include multiple cores, such as a first core 1204A, a second core 1204B, etc., through an Nth core 1204N. The SoC 1202 may include an analog signal processor 1208.

A display controller 1210 and a touchscreen controller 1212 may be coupled to the CPU 1204. A touchscreen display 1214 external to the SoC 1202 may be coupled to the display controller 1210 and the touchscreen controller 1212. The PCD 1200 may further include a video decoder 1216. The video decoder 1216 is coupled to the CPU 1204. A video amplifier 1218 may be coupled to the video decoder 1216 and the touchscreen display 1214. A video port 1220 may be coupled to the video amplifier 1218. A universal serial bus ("USB") controller 1222 may also be coupled to CPU 1204, and a USB port 1224 may be coupled to the USB controller 1222. A subscriber identity module ("SIM") card 1226 may also be coupled to the CPU 1204.

One or more memories may be coupled to the CPU 1204. The one or more memories may include both volatile and non-volatile memories. Examples of volatile memories include static random access memory ("SRAM") 1228 and dynamic RAMS ("DRAM"s) 1230 and 1231, Such memories may be external to the SoC 1202, such as the DRAM 1230, or internal to the SoC 1202, such as the DRAM 1231. A DRAM controller 1232 coupled to the CPU 1204 may control the writing of data to, and reading of data from, the DRAMs 1230 and 1231.

The DRAM controller 1232 may be an example of the memory controller 1204 described above with regard to FIG. 1, and one or both DRAMs 1230-1231 may be an example of the DDR 1202 described above with regard to FIG. 1. The DRAM controller 1232 may be configured (including, in some examples, by firmware) to control the methods described above with regard to FIGS. 10-11. In embodiments in which the DRAM controller 1232 or other processor is configured by firmware, software, etc., the associated memory and firmware stored therein (or in any other data storage medium) may define a "computer program product" or "computer-readable medium" as such terms are understood in the patent lexicon.

A stereo audio CODEC 1234 may be coupled to the analog signal processor 1208. Further, an audio amplifier 1236 may be coupled to the stereo audio CODEC 1234. First and second stereo speakers 1238 and 1240, respectively, may be coupled to the audio amplifier 1236. In addition, a microphone amplifier 1242 may be coupled to the stereo audio CODEC 1234, and a microphone 1244 may be coupled to the microphone amplifier 1242. A frequency modulation ("FM") radio tuner 1246 may be coupled to the stereo audio CODEC 1234. An FM antenna 1248 may be coupled to the FM radio tuner 1246. Further, stereo headphones 1250 may be coupled to the stereo audio CODEC 1234. Other devices that may be coupled to the CPU 1204 include a digital (e.g., CCD or CMOS) camera 1252.

A modem or radio frequency ("RF") transceiver 1254 may be coupled to the analog signal processor 1208. An RF switch 1256 may be coupled to the RF transceiver 1254 and an RF antenna 1258. In addition, a keypad 1260, a mono headset with a microphone 1262, and a vibrator device 1264 may be coupled to the analog signal processor 1208.

A power supply 1266 may be coupled to the SoC 1202 via a power management integrated circuit ("PMIC") 1268. The power supply 1266 may include a rechargeable battery or a DC power supply that is derived from an AC-to-DC transformer connected to an AC power source.

The SoC 1202 may have one or more internal or on-chip thermal sensors 1270A and may be coupled to one or more external or off-chip thermal sensors 1270B. An analog-to-digital converter ("ADC") controller 1272 may convert, voltage drops produced by the thermal sensors 1270A and 1270B to digital signals.

The touch screen display 1214, the video port 1220, the USB port 1224, the camera 1252, the first stereo speaker 1238, the second stereo speaker 1240, the microphone 1244, the FM antenna 1248, the stereo headphones 1250, the RF switch 1256, the RF antenna 1258, the keypad 1260, the mono headset 1262, the vibrator 1264, the thermal sensors 1270B, the ADC controller 1272, the PMIC 1268, the power supply 1266, the DRAM 1230, and the SIM card 1226 are external to the SoC 1202 in this exemplary or illustrative embodiment. It will be understood, however, that in other embodiments one or more of these devices may be included in such an SoC.

Alternative embodiments will become apparent to one of ordinary skill in the art to which the invention pertains without, departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for memory bank interleaving in a synchronous dynamic random access memory (SDRAM) system, comprising:
generating, by a memory controller, an initial physical memory address, the initial physical memory address comprising a plurality of bank group address bits, a plurality of bank address bits and a plurality of row bits;
generating, by the memory controller, a plurality of new bank group address bits and a plurality of new bank address bits by a primitive polynomial hash algorithm that utilizes all row bits; the primitive polynomial hash algorithm comprising: a string of bitwise exclusive-OR operations among a plurality of row bits and each bank group address bit, and a string of bitwise exclusive-OR operations among a plurality row bits and each bank address bit;
generating a modified physical memory address by replacing the plurality of bank group address bits and the plurality of bank address bits of the initial physical memory address with the respective plurality of new bank group address bits and plurality of new bank address bits, while the plurality of row bits of the physical memory address remain unchanged; and
providing, by the memory controller, the modified physical memory address to an SDRAM chip.

2. The method of claim 1, wherein primitive polynomial hash algorithm comprises applying a poly19 hash.

3. The method of claim 1, wherein the bank group address bits are in 11th and 12th bit positions of the initial and modified physical memory addresses, and the bank address bits are in 13th and 14th bit positions of the initial and modified physical memory addresses.

4. The method of claim 1, wherein the bank group address bits are in 7th and 11th bit positions of initial and modified physical memory addresses, and the bank address bits are in 13th and 14th bit positions of the initial and modified physical memory addresses.

5. The method of claim 1, wherein the primitive polynomial hash algorithm comprises hashing the plurality of bank group address bits in combination with the plurality of bank address bits in combination with a rank address bit with the row address bits.

6. The method of claim 5, wherein the primitive polynomial hash algorithm comprises applying a poly37 hash.

7. A system for memory bank interleaving in a synchronous dynamic random access memory (SDRAM) system, comprising:
a memory controller configured to generate an initial physical memory address, the initial physical memory address comprising a plurality of bank group address bits, a plurality of bank address bits and a plurality of row bits, and the memory controller further configured to generate a plurality of new bank group address bits and a plurality of new bank address bits by a primitive polynomial hash algorithm that utilizes all row bits; the primitive polynomial hash algorithm comprising: a string of bitwise exclusive-OR operations among a plurality of row bits and each bank group address bit, and a string of bitwise exclusive-OR operations among a plurality of row bits and each bank address bit;
the memory controller further configured to generate a modified physical memory address by replacing the plurality of bank group address bits and plurality of bank address bits of the initial physical memory address with the plurality of new bank group address bits and the plurality of new bank address bits, while the plurality of row bits of the physical memory address remain unchanged; and
wherein the memory controller is further configured to provide the modified physical memory address to an SDRAM chip.

8. The system of claim 7, wherein the primitive polynomial hash algorithm comprises applying a poly19 hash.

9. The system of claim 7, wherein the primitive polynomial hash algorithm comprises hashing the plurality of bank group address bits in combination with the plurality of bank address bits in combination with a rank address bit with the row address bits.

10. The system of claim 9, wherein the bank group address bits are in 11th and 12th bit positions of the initial and modified physical memory addresses, and the bank address bits are in 13th and 14th bit positions of the initial and modified physical memory addresses.

11. The system of claim 9, wherein the bank group address bits are in 7th and 11th bit positions of the initial and modified physical memory addresses, and the bank address bits are in 13th and 14th bit positions of the initial and modified physical memory addresses.

12. The system of claim 7, wherein the primitive polynomial hash algorithm comprises applying a poly37 hash.

* * * * *